United States Patent Office 3,193,730
Patented July 6, 1965

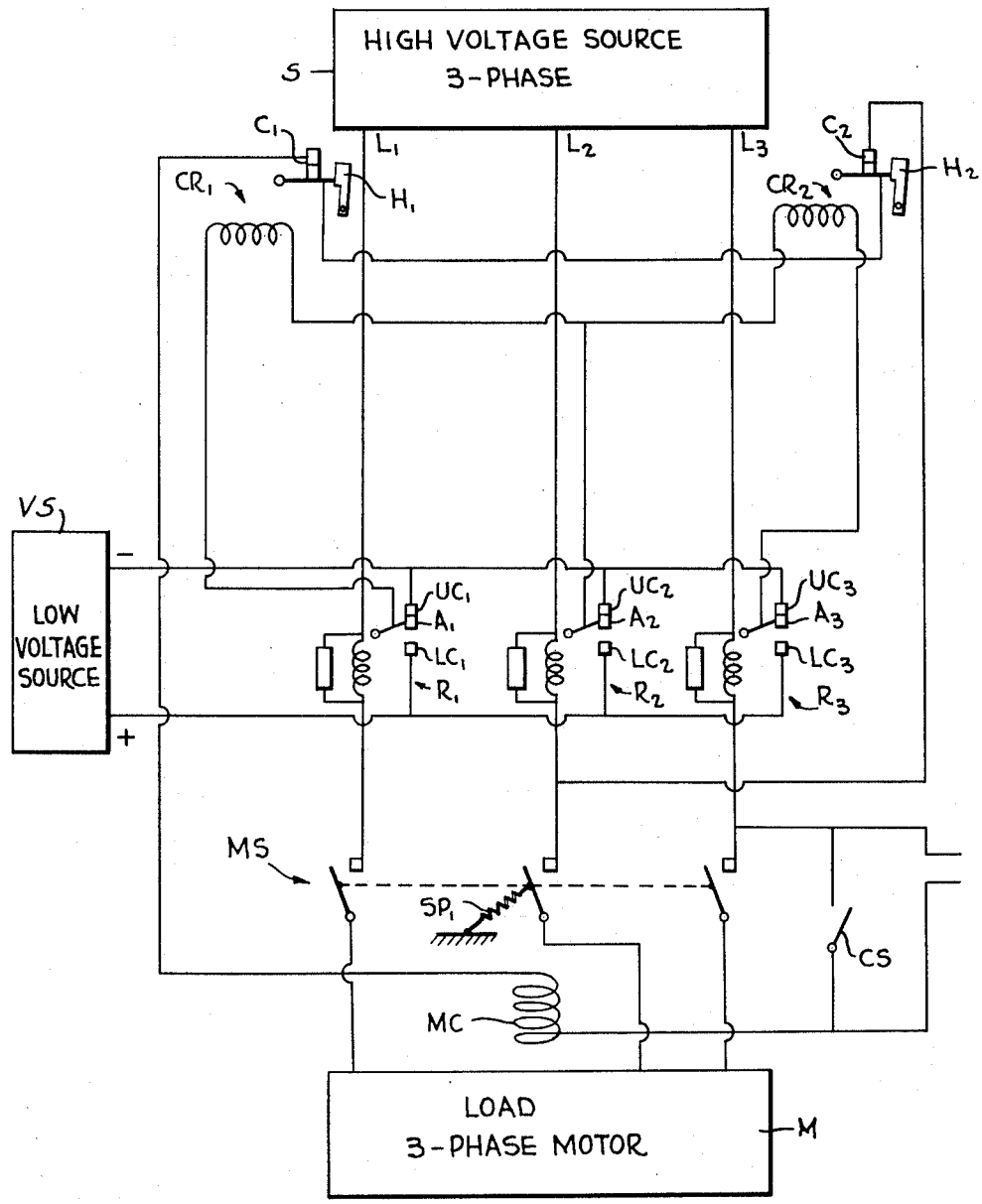
INVENTOR
FRANK C. MARTIN
BY Watson, Cole, Grindle + Watson
ATTORNEYS

3,193,730
ELECTRICAL PROTECTION SYSTEM
Frank C. Martin, 2325 N. 70th Ave., Omaha, Nebr.
Filed Dec. 20, 1961, Ser. No. 160,797
5 Claims. (Cl. 317—46)

This invention relates to an electrical protection system and more particularly to a three-phase electrical protection system.

Priorly, numerous forms of electrical protection systems have been employed in three-phase distribution networks. These known types of systems, however, exhibit certain disadvantages. For example, certain of these control systems derive power from the three-phase system and thus consume relatively large amounts of power and require that the control components be capable of withstanding the relative high voltage. Attempts have been made to obviate these disadvantages by connecting a stepdown transformer across two of the phases and the network. This, however, does not completely solve the problem since the stepdown transformer must be capable of withstanding these high voltages. Accordingly, it is an object of this invention to provide an improved three-phase electrical protection system.

It is another object of this invention to provide a three-phase electrical protection system which obviates the above-mentioned disadvantages.

It is a still further object of this invention to provide an improved protection system for a three-phase electrical distribution network which employs relatively inexpensive components and is therefore economical to produce.

It is another object of this invention to provide a three-phase electrical protection system employing low current, low voltage relays with windings serially connected in each phase of the three-phase distribution network and to employ a low voltage control system connected to be actuated through the contacts of the serially connected relays.

Briefly, in accordance with aspects of this invention, a three-phase electrical protection system is provided which includes shunts connected in parallel with each of the serially connected relay windings. The term "serially connected" is used to describe one winding of each of the relays which is connected in series with one of the phases of the three-phase network. The system includes a separate source of voltage, which is preferably a low voltage source, and a pair of control relays, the windings of which are connected in circuit with the low voltage source through the contacts of the serially connected relays. Advantageously, the contacts associated with the control relays are serially connected in circuit with a magnetic coil, which magnetic coil controls a master switch for the three-phase distribution network. Also advantageously, the serially connected control relay contacts are provided with latching means which prevent the reclosing of these contacts until the latches are positively released. Also advantageously, the serially connected relays each include a single pole double throw contact arrangement connected to the low voltage source and to the windings of the control relays in such a manner that each of the armatures connects the associated control relay winding to the same terminal of the low voltage source when all of the serially connected relays are in the same condition. For example, if all of the serially connected relays are energized, then the control relay windings are all connected to one terminal, such as the positive terminal, of the low voltage source. Similarly, if all of the shunt connected relays are de-energized then the control relay windings will all be connected to the other, or negative, terminal of the low voltage source. If, when all serially connected relay windings are energized, one of the serially connected relay windings is de-energized by some fault in the distribution network, then the associated serially connected winding is de-energized and the armature of this de-energized relay connects one side of at least one of the control relay windings to the other, or negative, terminal of the low voltage source. This causes at least one of the control relay windings to be energized, which control relay winding, in turn, opens the circuit of the magnetic coil controlling the master switch. The master switch then opens all three phases of the distribution system.

These and various other objects and features of this invention will be more clearly understood from a reading of the detailed description of the invention in connection with the drawing which shows a combined block and schematic diagram of one illustrative embodiment of this invention.

The drawing depicts a three-phase distribution network including a three-phase source, S, three-phase supply lines, L1, L2, and L3, which are to be connected to a suitable load, which for the purpose of explanation, is a three-phase motor, M. It will be understood, of course, by those skilled in the art, that any other form of load may be employed.

The distribution network includes a master switch, MS, having three pairs of contacts, one pair connected in series between each of the three-phase lines L1, L2, and L3, and the motor M. Also connected in the distribution network are three serially connected relays R1, R2, and R3, each having a winding connected in series between one of the pairs of contacts of the master switch MS and the source, S, through supply lines L1, L2, and L3, respectively. Each of the serially connected relay windings has a shunt connected in parallel with the winding, which shunt carries a majority of the three-phase current to the load M but provides a sufficient potential difference across the associated relay winding to actuate the relay. Thus, the serially connected relay winding can be of the low voltage, low current type. As shown in the drawing, relays R1, R2, and R3 each have an armature A1, A2, and A3, respectively, an upper contact UC1, UC2, and UC3 and a lower contact LC1, LC2, and LC3, respectively. When the relays R1, R2, and R3 are de-energized, the armatures A1, A2, and A3 are urged into contact with the upper contacts UC1, UC2, and UC3, respectively, by suitable springs, not shown. When relays R1, R2, and R3 are energized, however, the respective armatures are drawn into contact with the lower contacts LC1, LC2, and LC3, respectively. Each of the upper contacts is connected to the negative terminal of a low voltage source VS. Similarly, each of the lower contacts is connected to the positive terminal of the low voltage source VS. The armatures A1 and A3 of relays R1 and R3, respectively, are connected to one side of one winding of control relays CR1 and CR2, and armature A2 of relay R2 is connected to the other sides of both windings.

Thus, it will be apparent that if relays R1, R2, and R3 are all in the same condition, either energized or de-energized, then both sides of the control relay windings will be connected to the same potential of the low voltage source VS and no current will flow through the control relay windings.

Advantageously, the magnetic coil MC of the master switch MS is connected across two phases of the distribution network, namely L2 and L3, through a control switch CS and the contacts C1 and C2 of control relays CR1 and CR2, respectively. Thus, when the control switch CS is closed, the magnetic coil MC is energized from lines L2 and L3 through contacts C1 and C2 which are normally closed. The completion of the energizing circuit of magnetic coil MC causes the contacts of the master switch MS to be closed, thus completing the circuit from source, S, through distribution lines L1, L2, and L3 to load, M. When the distribution lines are connected to the load through the master switch, the serially connected windings of relays R1, R2, and R3 will be energized. When the serially connected windings are energized, armatures A1, A2, and A3 are attracted into engagement with contacts LC1, LC2, and LC3, respectively. Since each of the lower contacts is connected to the positive terminal of low voltage source VS, then the windings of control relays CR1 and CR2 are de-energized. If, however, a fault occurs in one of the phases of the distribution system, L1, L2, or L3, the winding of the associated serially connected relay R1, R2, or R3 will be de-energized. Assume for a moment that the winding of the motor connected to conductor L2 becomes open, then the winding of relay R2 will be de-energized and the armature A2 will be returned to its upper contact UC2 by means of the previously mentioned spring, not shown. Under this condition, the windings of control relays CR1 and CR2 are connected in parallel across the low voltage source VS. When the windings of control relays CR1 and CR2 are energized, the associated contacts C1 and C2 are opened, thus interrupting the energization circuit of magnetic coil MC. When the circuit of coil MC is open, the master switch MS is opened by suitable springs, such as SP1. Thus, the motor M is disconnected from the distribution system.

If the motor winding connected to L3 had become open, then the relay R1 would have been de-energized, and winding of CR1 would have been connected across the low voltage source VS through the armatures A1 and A2, thus opening the contact C1 and thereby de-energizing the magnetic coil MC. Similarly, if the fault had occurred in the motor winding connected to L3, then relay R3 would be de-energized and the winding of control relay CR2 would have been connected across the low voltage source VS through armatures A2 and A3. Under these conditions, the control relay CR2 would have been energized, thus opening contacts C2.

Advantageously, contacts C1 and C2 have individual latches H1 and H2, respectively. These latches retain the respective contacts C1 and C2 in open circuit condition after the windings of the control relays are energized and are subsequently de-energized. Thus, even though the fault is removed and the control switch CS is reclosed, the circuit of magnetic coil MC still cannot be energized. It is therefore necessary to restore the latches to their initial position, thus providing a positive assurance that the trouble has been removed.

To improve the current carrying capacity of this system, current carrying shunts are connected in parallel with each of the windings of relays R1, R2, and R3.

While I have shown and described one illustrative embodiment of this invention, it is understood that the principles thereof can be applied to other embodiments without departing from the spirit and scope of this invention.

What is claimed is:

1. An electrical protection system for a three-phase distribution network connected to a source including a load to be connected to each of said phases of said source, a master switch serially connected between each of the phases of said load and said distribution source, a plurality of relays, each having a movable armature contacting two mating contacts in respective energized and deenergized conditions and each having a winding serially connected with one of said phases between said master switch and said three-phase source, a pair of control relays, means for actuating said master switch from two of the phases of said three-phase source, said last-mentioned means including the contacts of said pair of control relays, a low voltage source, means connecting two terminals of said low voltage source to said two contacts of each of the serially connected relays, and means connecting the windings of said control relays for operation from said low voltage source when said armatures of the plurality of relays are connected to both terminals of said low voltage source.

2. A protection system according to claim 1 wherein each of said windings of the serially connected relays has a shunt connected in parallel therewith to carry the major portion of the current to said load.

3. A protection system according to claim 1 wherein each of said control relays includes latching means for retaining the control relay contacts in an open circuit condition after the associated control relay winding has been energized thus preventing reclosing of the distribution system after the fault has been removed.

4. An electrical protection system for a three-phase distribution network connected to a three-phase source comprising a load connected to each of the phases of said source, a master switch serially connected between said load and said source, a plurality of relays, one of each of said relays being serially connected between one of the phases of said source and one of the contacts of said master switch, each of said relays having an armature and a pair of contacts to be alternately connected to said armature, a pair of control relays, each having a winding connected between two of the armatures of said serially connected relays, magnetic coil means connected in circuit with two of the phases of said distribution network and a first and a second pair of contacts operatively associated with a separate one of said pair of control relays, and a low voltage source having one terminal connected to one contact of each of said serially connected relays and the other terminal connected to another contact of each of said serially connected relays.

5. The system according to claim 4 wherein each of said control relays includes latching means for latching the associated contacts in an open circuit condition.

References Cited by the Examiner
UNITED STATES PATENTS

| | | | |
|---|---|---|---|
| 1,189,409 | 7/16 | Van Alstyne | 317—46 |
| 1,314,332 | 8/19 | Jones | 317—46 |
| 1,381,302 | 6/21 | Harvey et al. | 317—46 X |

SAMUEL BERNSTEIN, *Primary Examiner.*